United States Patent [19]
Gorgens et al.

[11] 3,768,311
[45] Oct. 30, 1973

[54] MOTION RESPONSIVE ELECTRICAL CONTROL APPARATUS

[75] Inventors: Joseph E. Gorgens; William A. Heske, both of Fairfield, Conn.

[73] Assignee: Dresser Industries, Inc., Dallas, Tex.

[22] Filed: Feb. 8, 1971

[21] Appl. No.: 113,419

Related U.S. Application Data

[63] Continuation-in-part of Ser. No. 859,246, Sept. 17, 1969, which is a continuation of Ser. No. 732,472, April 12, 1968, abandoned which is a continuation-in-part of Ser. No. 565,857, July 18, 1966, abandoned.

[52] U.S. Cl. ............ 73/398 AR, 73/411, 73/432 A
[51] Int. Cl. .............................................. G01l 9/00
[58] Field of Search ................. 73/411, 418, 432 A; 338/91

[56] References Cited
UNITED STATES PATENTS

| | | | |
|---|---|---|---|
| 2,910,870 | 11/1959 | Schaefer | 73/407 PR |
| 3,285,071 | 11/1966 | Plunk et al. | 73/407 PR |
| 3,299,701 | 1/1967 | Scarlett | 73/407 R |
| 3,301,062 | 1/1967 | Reesby et al. | 73/418 X |

*Primary Examiner*—Donald O. Woodiel
*Attorney*—Robert W. Mayer, Thomas P. Hubbard, Jr., Daniel Rubin, Raymond T. Majesko, Roy L. Van Winkle, William E. Johnson, Jr. and Eddie E. Scott

[57] ABSTRACT

A motion responsive electrical control apparatus for emitting an electrical control signal incrementally variable in desired correlation to a path of given mechanical motion. The apparatus includes a rotatably regulated electrical controller for emitting signals correlated to the angular position setting of the controller regulator. A cam member pivotally mounted onto the regulator of the controller is arcuately biased into overlying engagement with a movable follower defining a motion path to which the apparatus is to respond. Presettably adjustable pitch members incrementally spaced along the path of follower motion effect desired incremental changes in cam pitch thereat affording corresponding change to the controller position setting.

10 Claims, 7 Drawing Figures

INVENTORS:
JOSEPH E. GORGENS
WILLIAM A. HESKE

ATTORNEY

MOTION RESPONSIVE ELECTRICAL CONTROL APPARATUS

CROSS-REFERENCE TO RELATED APPLICATIONS

Application Ser. No. 859,246, filed Sept. 17, 1969, which is a continuation of an application Ser. No. 732,472, filed Apr. 12, 1968 (now abandoned), and which in turn is a continuation-in-part of application Ser. No. 565,857, filed July 18, 1966 (now abandoned), all entitled "Condition Responsive Apparatus".

BACKGROUND OF THE INVENTION

1. The field of art to which this invention relates comprises the art of "Electrical Resistors" as contained in Patent Office class 338 for apparatus providing variable electrical regulation in response to mechanical motion.

2. The use of rotatably regulated electrical controls such as rheostats, potentiometers and the like for circuit control in response to various forms of mechanical motion are well-known and widely utilized. Characteristically common of these prior devices is their limitations imposed by a fixed correspondence to the path of motion to which they are responsive and their inability to alter that relationship without major difficulty and/or expense. While these limitations are adequate and satisfactory for many applications of use, the motion pattern of some use applications do not lend themselves to sufficiently accurate predictability for which the response correspondence of these prior art devices can be fabricated in advance. On the otherhand, it has not been known heretofore how to precisely vary the response characteristics to accommodate the individual unit with which it is to be operative. Consequently attempts to operate these prior controls against those unpredictable motion patterns has met with less than ideal success.

Typifying the latter situation of unpredictable motion patterns are production made items in which the range of manufacturing tolerances between cooperating parts can cause considerable variations in operating characteristics. To accommodate such situations, the approach has been to use a more or less "average" motion response to which the control apparatus is rendered sensitive. Whereas "average" motion response is acceptable in a majority of instances, it can be readily appreciated that "average" response is not satisfactory where associated with a high precision instrument in which a high order of accuracy is critical to the represented quality of such instruments.

Recently there has been discovered a novel condition responsive apparatus as disclosed in the cross-referenced application hereof and capable of rapid pressure measurement indication or signal emission to a high level of accuracy within the order of 0.05 percent of the full range. The unit thereof employs the principle of force balance, condition being measured produces bi-directional movement of a sensor from the null-position to in turn generate operating signals correlated and proportional to the degree of condition change. The signals so generated are effective via a drive mechanism to restore balance at null-position while concomitantly indicating gauge values of the incurred condition. Being adapted for a high degree of sensitivity and readout accuracy, the unit includes a combination of mechanical drive with motive power from a variety of selective energy sources, such as pneumatic, electronic, electric, etc.

Despite careful selection and assembly of components it has been found that calibration accuracy for that condition responsive apparatus on the order expected was most difficult and highly unpredictable. On careful examination it was discovered that certain components of the feedback drive incurred variable operating characteristics in response to torsional loads to which they were being subjected and with variations from one unit to the other. While recognizing that the variations could be controlled by a form of regulated electrical compensation, it was also recognized that such prior art devices for that purpose were for the aforementioned reasons too inflexible to obtain the compensation accuracy which the instrument required.

SUMMARY

This invention relates to apparatus for effecting regulated electrical signal output correlated to a mechanical motion to which it is sensitive. More particularly, the invention relates to such electrical output apparatus which can simply and easily be variably preset during a post-assembly calibration production step to obtain assured instrument accuracy on an individual unit basis. In accordance with the invention hereof this result is achieved by use of a flexible cam of readily adjustable pitch mounted onto the rotatable regulator of an electrical controller and extending in a general direction of motion to be sensed. The pivot position of the cam mount, resulting from cam engagement against a travelling follower, positions the controller setting for regulating the emitted output control signal. By presetting the adjustable cam pitch incrementally along the motion path as desired, a completely correlated control regulation is obtained throughout the entire motion path. Since onsite, post assembly, adjustment can be readily set without difficulty in a matter of seconds, the prior problems associated with "average" response sensitivity are conveniently and inexpensively overcome. For the aforementioned condition responsive gauge apparatus of the cross-referenced application hereof, the invention provides a highly accurate linearity compensation for instilling production reliability in maintaining intended accuracy of the instrument.

It is therefore an object of the invention to provide novel apparatus for effecting regulated electrical signal output correlated to a mechanical motion to which it is to respond.

It is a further object of the invention to provide a novel electrical control apparatus affording readily adjustable variably preset operating characteristics for effecting accurately correlated response to a mechanical motion.

It is a still further object of the invention to provide a control apparatus as in the aforesaid objects which lends itself to a high level of adjustment accuracy for providing accurate linearity compensation in a high precision gauge instrument.

Reference is now made to the drawings in which the invention will be described in conjunction with a pressure indicating apparatus of the aforementioned null-position type disclosed in the cross-referenced application hereof and incorporated herein by reference. It is to be understood however that describing the instant invention in combination with a pressure indicating apparatus of the cross-referenced application is a preferred embodiment for purposes of explanation but is not intended as a limitation of the invention which can obviously have many applications too numerous to mention.

Figure 1:
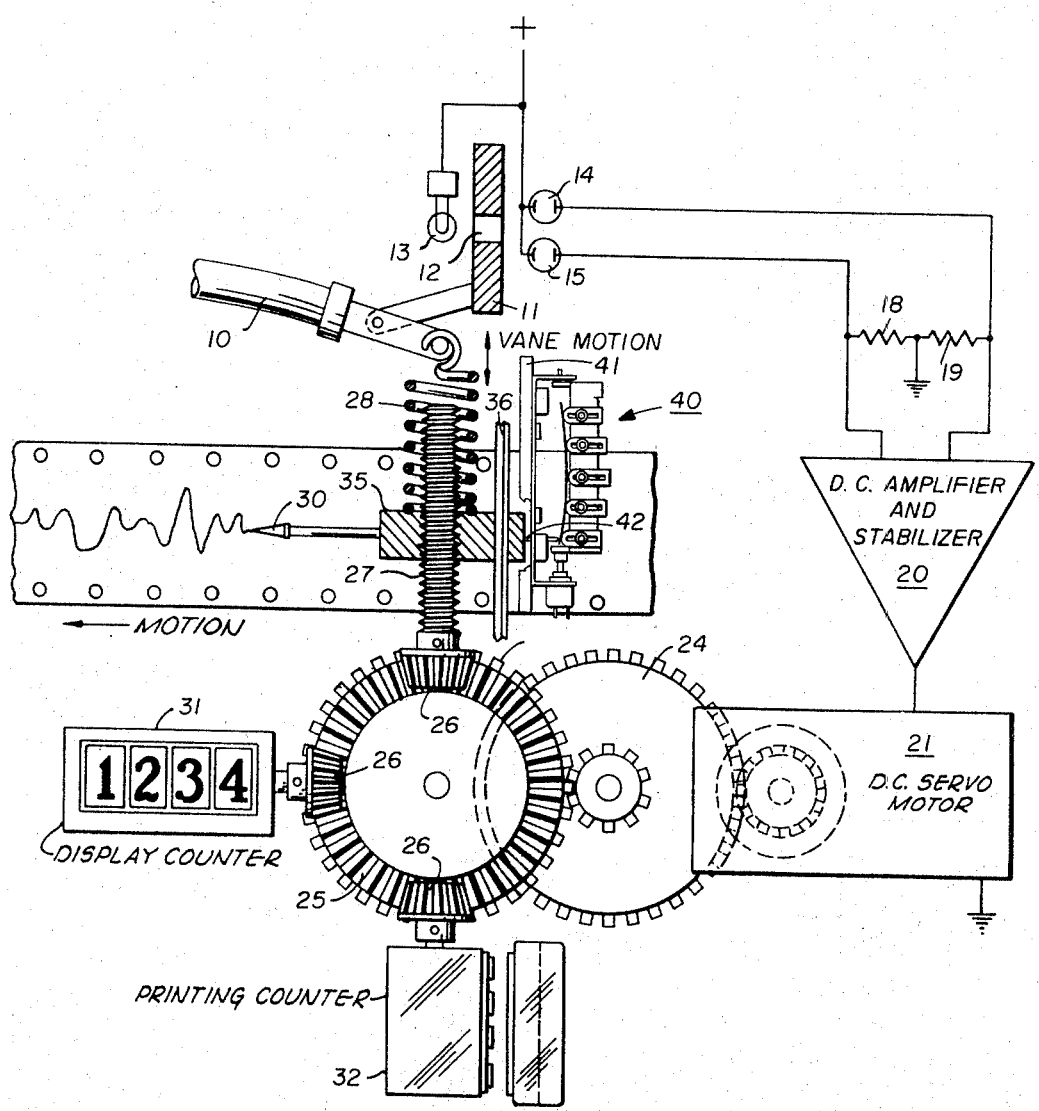
FIG. 1 is a schematic representation of a gauge instrument in accordance with the parent application hereof as modified to incorporate the instant invention.
Figure 2:
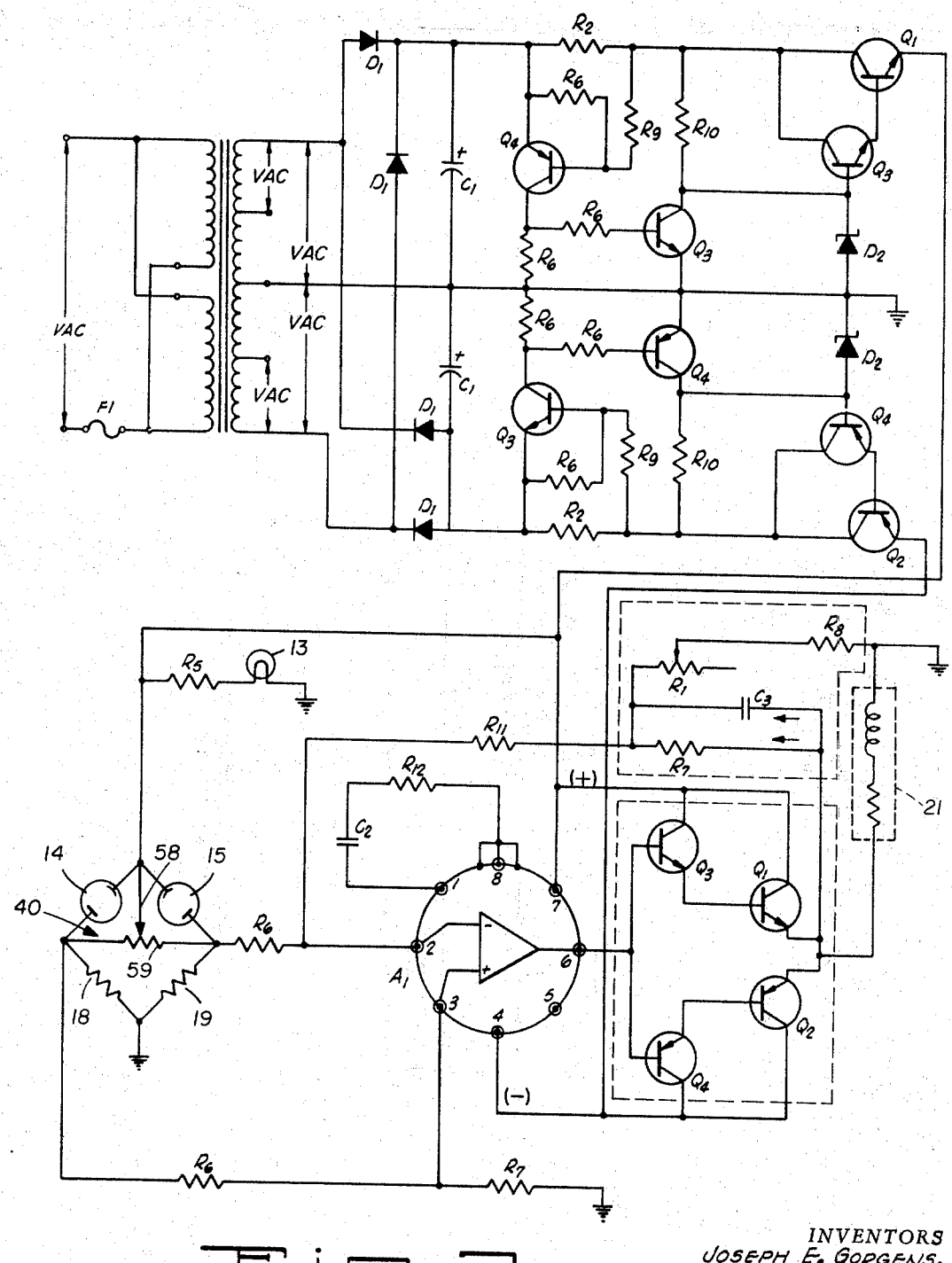
FIG. 2 is an electrical schematic of the instrument of FIG. 1.
Figure 3:
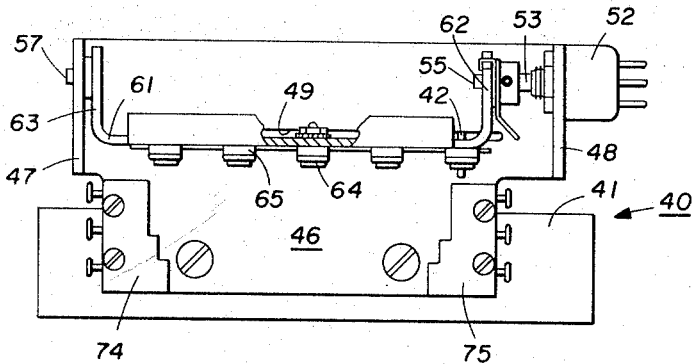
FIG. 3 is a top plan view of the controller apparatus hereof.
Figure 5:
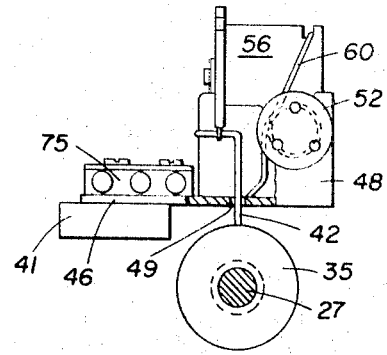
FIG. 5 is an end elevation view of the controller apparatus hereof.
Figure 4:
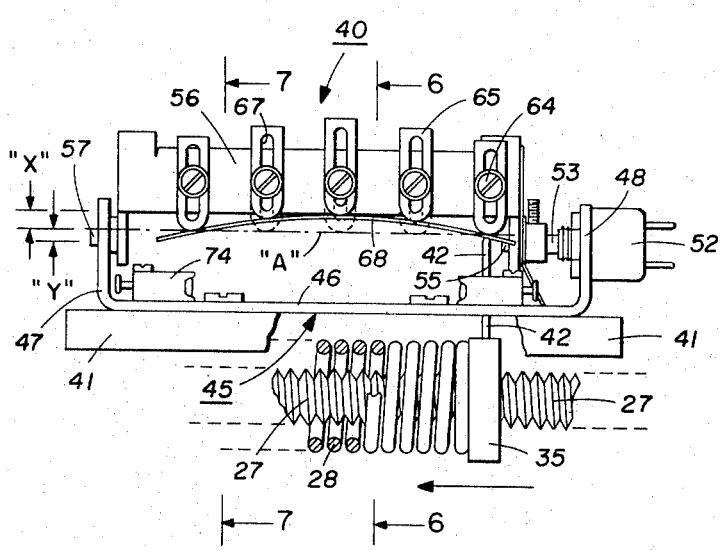
FIG. 4 is a front elevation view of the controller apparatus hereof.
Figure 6:
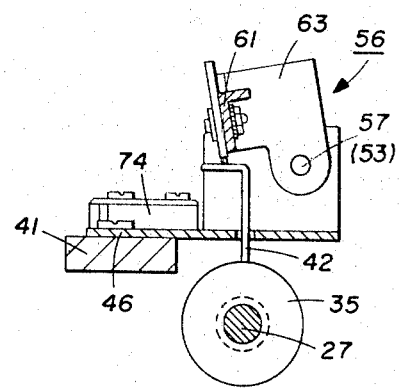
FIG. 6 and 7 are sectional elevations taken substantially along the lines 6—6 and 7—7 respectively of FIG. 4.
Figure 7:
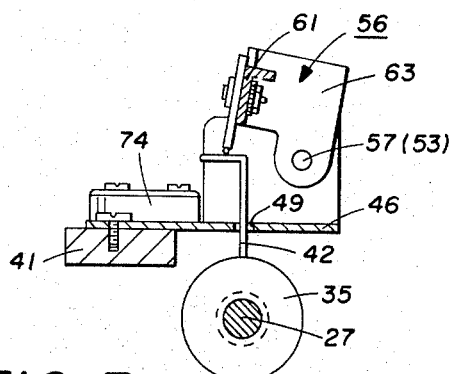

Referring specifically to FIGS. 1 and 2, pressure of the system being measured is communicated to the forward free end of a Bourdon 10 normally connected to a vane member 11. The vane member has a transverse slit 12 which when in the null-position is located intermediately positioned between a constantly energized lamp 13 and dual photocell elements 14 and 15. In this relation, a constant but minimal illumination is exposed to each of the photocells and by virtue of a balanced bridge circuit intermediately biased to ground, a zero voltage differential exists across the input to differential amplifier-stabilizing network generally designated 20. Movement of Bourdon tube 10 in response to changes in the sensed pressure condition, causes the light beam passing through slit 12 to be shifted off center as to unbalance the bridge and result in an amplified signal to drive DC servo-motor 21. Both direction and operational rate of motor 21 is correlated and proportional to the position shift of slit 12 and is effective via a feedback mechanism comprising gears 24, 25, and 26, lead screw 27 and feedback spring 28 to return vane slit 12 to null-position at which the light beam rebalances the bridge.

In the course of rebalancing to null-position, movement of Bourdon tube 10 is opposed by linearizing tension spring 28 secured to a block 35 which travels on lead screw 27 and is maintained guided in its course of movement by a guidepost 36. When activated, the feedback mechanism is adapted to operate a variety of remote indicators such as transcribing pin 30, visual display 31, and/or printing counter 32 or the like by which the measured condition can be appropriately indicated. Despite spring 28 being generally characterized as a "linearizing" type, the torsional forces to which it is subjected under the conditions just described tends to produce a somewhat marginal non-linearizing effect the result of which is to detract from the ultimate accuracy of instrument readout. To accurately compensate for non-linearity, however marginal, there is provided the electrical control apparatus 40 of the invention hereof mounted secured onto a stationary block 41 arranged opposite and extending in the general direction to the motion path of block 35. Secured extending laterally outward from block 35 for conjoint movement therewith is an L-shaped follower pin 42 providing a corresponding motion path to which the apparatus hereof is responsive as will now be described.

Referring now also to FIGS. 3–7, the control apparatus 40 for providing linearizing compensation to the gage instrument includes a mounting bracket 45 secured to support 41 in a manner arranged to extend opposite and generally parallel to the motion path of block 35. The bracket is comprised of a bottom plate 46 bent upright at its ends 47 and 48 for cradling the support of other components hereinafter described. Defined extending longitudinally in the bottom plate 46 is a central open slot 49 through which follower pin 42 extends for travel throughout the longitudinal advance limits of block 35.

Secured to mounting bracket 46 at end 48 is a rotatably regulated electrical control 52 of a well known type such as a rheostat, potentiometer, or the like. In a preferred embodiment the control comprises a potentiometer of a type commercially available and which for the purposes described comprises a Spectrol model 140-0-0-503. Regulation of potentiometer 52 which includes a wiper 58 and a resistance 59 is by position setting of arcuately rotatable regulating pin 53.

For setting the desired operative position of pin 53 there is provided a pivotal cam mounting bracket 56. The latter bracket is coupled to pin 53 via coupling 54 and pivotally supported by means of a bushing 55 at end 48 of bracket 45 while at end 47 of bracket 45 it is similarly supported by bushing 57. Bushings 55 and 57 are in coaxial alignment with each other and with regulator pin 53 to define the pivot axis about which bracket 56 arcuately moves. A piano wire expansion spring 60 secured rotatably compressed between base bracket 45 and cam bracket 56 constantly urges or biases the latter bracket in a counter-clockwise direction (as viewed in FIGS. 5–7) for reasons as will be understood. Cam bracket 56 is comprised of a longitudinally extending front face 61 terminating in foldover ends 62 and 63 through which bushings 55, 57 respectively are received secured thereto.

Adjustably mounted on front face 61 via screws 64 are a plurality of individual longitudinally spaced cam pitch forming members 65 having elongated slots 67. Each member 65 is incrementally spaced from its adjacent member and any feasible quantity of members 65 at any optimum incremental spacing can be employed as desired. Within practical limits, accuracy and sensitivity of the apparatus is increased correspondingly with decrease in member spacing. For purposes of illustration and description of the invention, five such members 65 are shown which in the preferred embodiment are spaced on about 17/32 inch centers.

Secured welded to and spanning between the underedge 66 of pitch members 65 is a cam member 68 formed of fine wire of about 0.025 inch diameter. It can be seen, by specific reference to FIG. 4, that the pitch of cam 68 throughout its overall length is governed by the individual and collective displacement distances of the members 65 relative to a motion path A defined by movement of follower pin 42. For the described embodiment, path A represents straight line motion for a course of linear pin movement through a distance set by limit stops 74 and 75. During the course of pin movement, angular displacement of bracket 56 (and pin 53) relative to path A is defined in a counter-clockwise direction (as viewed in the drawings) by the dimension X and in a clockwise direction by the dimension Y.

Setting of individual pitch members 65 to proper adjustment is by moving the member via elongated slot 67 under lock screw 64 until a desired lateral edge spacing relative to motion path A is obtained. By having a plurality of such members 65 incrementally and uniformly spaced to define "match points" along the longitudinal length of motion path A, the arcuate displacement of bracket 56 at these match points and consequently the degree of angular regulatory change to potentiometer 52, can be accurately preset to precisely match required regulation or compensation change thereat. Between connection to pitch members 65, cam pitch is governed by a natural slope of cam wire 68 extending therebetween. The effect of slope can be reduced and minimized by employing more closely spaced pitch members 65 as to consequently afford increased "match points" over a given motion distance for obtaining increased precision of control.

In operation, the electrical apparatus 40 hereof is secured on a support 41 in operative proximity to a movable cam follower 42 defining a path of motion to which the apparatus is to be responsive. On determining the motion path to be defined by the cam follower, each of the underedges 66 of pitch members 65 to which continuous cam 68 has been secured are set to place the cam at the longitudinal "match points" to cause an angular displacement thereat defining a desired regulatory position setting for potentiometer 52. With each juxtaposed displacement, flexible cam surface 68 assumes a natural contour between adjacent members such that gradual angular change in displacement from one match point to the other is achieved. Since spring 60 constantly biases bracket 56 in a counter-clockwise direction (as viewed in the drawings) the surface of cam 68 is maintained in continuous contacting engagement with the top surface of follower pin 42 as it moves leftward (reference FIG. 4) between its operative travel limits. By comparing the relative arcuate positions of cam bracket 56 in FIGS. 5, 6, and 7, the angular changes in bracket position can be readily seen as affording a concomitant and corresponding angular position change to pin 53 which in turn effects similar change in regulator output of potentiometer 52.

With respect to operation of the gauge instrument illustrated in FIGS. 1 and 2, the apparatus provides electrical linearity compensation to non-linear mechanical motion. Potentiometer 52 is connected into the photocell/error detector bridge circuit and wiper 58 is positioned as a function of the feedback spring 28 position along lead screw 27 through the pitch arrangement afforded cam 68. With cam 68 in a neutral position at 0 percent of scale, wiper 58 is positioned relative to the cam bracket 56 so that no change in bridge balance occurs. With each equal half of potentiometer resistance element 59 connected in parallel with each of the photocell elements respectively the bridge remains balanced. Moving wiper 58 a small amount in either direction causes servo-system 21 to rebalance at a new zero position. Since wiper 58 is positioned by rotation of cam bracket 56 which in turn is positioned as a function of cam pitch and feedback spring position, a small "zero" change in the calibration curve results between lead screw rotation and pressure force input at tube 10.

By the above description there has been disclosed a novel electrical control apparatus affording a high degree of flexibility in adjustably presetting controller regulation in response to mechanical motion to which a correlated signal shift is required or desired. In the embodiment described, electrical apparatus hereof affords a means to readily and accurately provide linearity compensation to a gauge instrument disclosed in the cross-referenced application hereof and which otherwise had a degree of undersirable non-linearity which could not be easily corrected. By means of the cam member enabling setting any desired cam pitch at various incremental match points along the path of motion, there is simply and inexpensively achieved a degree of regulation not previously possible with such similar purpose prior art devices.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a condition responsive gauge instrument for indicating values of a sensed condition comprising the combination of:
    a. condition sensing means movable in a motion path from a reference location in proportional response to changes in a sensed condition;
    b. feedback means operative in a motion path in opposition to movement of said condition sensing means for restoring said condition sensing means to said reference location;
    c. indicating means operative by said feedback means for indicating values of a condition being sensed by said condition sensing means; and
    d. compensating means operatively responsive to error deviations from a predetermined motion pattern incurred by one of said sensing means or said feedback means in its motion path for emitting electrical compensating signals operatively offsetting said error deviations to electrically maintain the accuracy of condition values indicated by said indicating means, said compensating means including means for variably presetting the emitted electrical signal level in correlation to the encountered error deviations.

2. In a condition responsive gauge instrument according to claim 1 in which said compensating means is variably responsive at incrementally displaced locations along the motion path defined by said feedback means.

3. In a condition responsive gauge instrument according to claim 2 in which said feedback means includes a follower secured extending outward thereof and said compensating means includes:
    a. rotatably regulated electrical control means adapted to emit a control signal correlated to its position setting;
    b. cam means having an extended cam surface adapted to engage said follower during its course of movement, said cam means being secured to the rotatable regulator of said control means for arcuate movement effective to change the position setting of said control means; and c. variably presettable means to adjustably preset the pitch of said cam surface for effecting a desired control signal correlated to error deviations in the motion path of said follower.

4. In a condition responsive gauge instrument for indicating values of a sensed condition comprising the combination of:
 a. condition sensing means movable from a reference location in proportional response to changes in a sensed condition;
 b. feedback means including a follower extending outward thereof and operative by opposition movement in response to movement of said condition sensing means for restoring said condition sensing means to said reference location;
 c. indicating means operative by said feedback means for indicating values of a condition being sensed by said condition sensing means; and
 d. compensating means operatively connected to electrically maintain the accuracy of condition values indicated by said indicating means, said compensating means being operatively responsive to a mechanically produced motion path defined by said feedback means and including:
  1. rotatably regulated electrical control means adapted to emit a control signal correlated to its position setting;
  2. cam means having an extended cam surface adapted to engage during its course of movement, said cam means being secured to the rotatable regulator of said control means for arcuate movement effective to change the position setting of said control means; and
  3. variably presettable means to adjustably preset the pitch of said cam surface for effecting a desired control signal correlated to the motion path of said follower.

5. In a condition responsive gauge instrument according to claim 4 in which said cam means is of a generally flexible composition secured to said presettable means and geometrically responsive to adjustable settings thereof.

6. In a condition responsive gauge instrument according to claim 5 in which said variably presettable means comprises a plurality of pitch setting members incrementally spaced along the defined path of motion and individually adjustable in a lateral direction relative thereto.

7. In a condition responsive gauge according to claim 6 in which said cam means comprises an extending thin flexible wire at least spanning the motion path of said follower and secured to each of said pitch setting members at a reference location thereon.

8. In a condition responsive gauge instrument according to claim 7 in which said individual pitch setting members are elongated of predetermined length adjustably positionable for securement to a pivottal support and said cam means is secured to each of said pitch setting members at a common terminal end thereof.

9. In a condition responsive gauge instrument according to claim 7 in which said electrical control means comprises a variable electrical resistance adapted for connection to an electrical circuit associated with said follower feedback means for providing resistance values to the circuit correlated to its rotatably set position.

10. In a condition responsive gauge instrument according to claim 8 in which said electrical control means comprises a variable electrical resistance adapted for connection to an electrical circuit associated with said follower feedback means, said control means having a rotatable adjustment regulator to which said pitch setting members support is secured for defining the pivot axis thereof.

* * * * *

PO-1050
(5/69)

UNITED STATES PATENT OFFICE
CERTIFICATE OF CORRECTION

Patent No. 3,768,311      Dated October 30, 1973

Inventor(s) J. E. Gorgens et al

It is certified that error appears in the above-identified patent and that said Letters Patent are hereby corrected as shown below:

1. On the front page under "Related U.S. Application Data" delete "[63] Continuation-in-part of" and substitute --[60]--.

Signed and sealed this 2nd day of April 1974.

(SEAL)
Attest:

EDWARD M.FLETCHER,JR.          C. MARSHALL DANN
Attesting Officer              Commissioner of Patents

PO-1050
(5/69)

UNITED STATES PATENT OFFICE
CERTIFICATE OF CORRECTION

SECOND

Patent No. 3,768,311                     Dated October 30, 1973

Inventor(s) J. E. Gorgens et al

It is certified that error appears in the above-identified patent and that said Letters Patent are hereby corrected as shown below:

1. Column 7, line 29, after "engage" insert

--said follower--.

Signed and sealed this 29th day of October 1974.

(SEAL)
Attest:

McCOY M. GIBSON JR.
Attesting Officer

C. MARSHALL DANN
Commissioner of Patents